May 19, 1925. 1,538,460
F. v. BRECHT
MEANS AND METHOD FOR HANDLING FOOD CASINGS
Original Filed Jan. 25, 1924

INVENTOR
Frank V. Brecht
BY E. E. Huffman
ATTORNEY

Patented May 19, 1925.

1,538,460

UNITED STATES PATENT OFFICE.

FRANK V. BRECHT, OF ST. LOUIS, MISSOURI.

MEANS AND METHOD FOR HANDLING FOOD CASINGS.

Application filed January 25, 1924, Serial No. 688,373. Renewed November 14, 1924.

*To all whom it may concern:*

Be it known that I, FRANK V. BRECHT, a citizen of the United States of America, residing at the city of St. Louis, State of Missouri, United States of America, have invented a certain new and useful Means and Method for Handling Food Casings, of which the following is such a full, clear, and exact description as will enable any one skilled in the art to which it appertains to make and use the same, reference being had to the accompanying drawings, forming part of this specification.

My invention relates to improved means and method for handling, shipping and applying to stuffing machines, casings made from animal intestines, which are used as containers for foods, including sausages and other packinghouse products.

In accordance with present practice, casings after being cleaned and prepared for use, are usually gathered together in bundles and salted for storage and shipping. Being very small in their collapsed state, and very light and flexible they become twisted and tangled and much time is consumed in separating them and applying them, without tearing, to the spouts of the stuffing machines in the sausage rooms. It is the object of my invention to entirely avoid these difficulties, to reduce the cost of shipping and handling, and also to provide means whereby the casings can be applied quickly to the stuffer spout without any possibility of tearing them.

Figure 1:
Figure 2:
Figure 3:
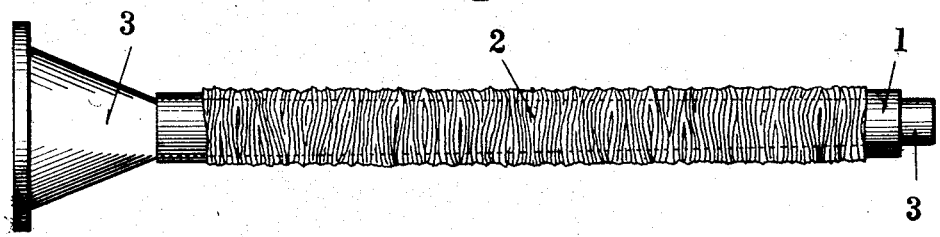

In the accompanying drawings, Figure 1 indicates the appearance of one kind of casing when prepared for shipment and use in accordance with the present practice; Figure 2 shows a casing as prepared and mounted for shipment and use in accordance with my invention; and Figure 3 shows the same applied to the spout of a stuffing machine.

In carrying out my invention an animal intestine, when cleaned and prepared for use as a casing, is applied either by hand or by a machine, to a collapsible, water-proofed tube 1 of suitable material, such as paper, the tube being of sufficiently smaller diameter than the casing 2 to permit the formation of circumferential folds in the casing whereby a casing may be mounted on a tube whose length is much less than the length of the casing and less than the length of the spout of the stuffing machine.

After being mounted on the tube, the casing is dried and the assembled casing and mounting tube is flattened as shown in Figure 2. In this form casings may be closely and economically packed for shipment and yet each will remain entirely free from others and there will be no difficulty in separating them.

Prior to the application to the stuffing machine, the mounted casings are immersed in warm water to again render them soft and pliable, and then by pressure on the edges or otherwise, the end of the mounting tube is opened to receive the end of the stuffer spout 3 of the filling machine and is pushed over the spout. The tube may be quickly and readily withdrawn from the casing which is then properly mounted on the spout for filling in the usual manner. Of course the removal of the mounting tube before the filling of the casing, is not essential if the tube is prevented, by suitable means, from slipping off the spout.

The advantages of my invention in shipping, handling and use of meat casings, in the matter of convenience and reduction of labor expense, will be apparent.

Having fully described my invention, what I claim as new and desire to secure by Letters Patent of the United States is:

1. The combination of a tubular flexible container for meats and the like, and a hollow flexible container supporting member passing therethrough.

2. The combination of a tubular dry container for meats and the like, and a hollow flexible container supporting member passing therethrough, said supporting member and container being capable of being flattened without injury.

3. The combination of a tubular flexible container for meats and the like, and a hollow collapsible, water-proofed casing supporting member passing therethrough.

4. The combination of a tubular flexible food container, and a tubular supporting member of smaller cross-sectional area than the container, said supporting member passing through the container and said container having circumferential folds whereby the support carries a container of much greater length than the length of the support.

5. The combination with a stuffing machine having an elongated spout, of a hollow container supporting member adapted to pass over said spout, and a tubular flexible food container mounted on the supporting member, said stuffer spout being of geater length than the supporting member.

6. An article of the class described comprising a hollow collapsible supporting member, and a tubular food casing of greater length than the supporting member, said supporting member passing through the casing.

7. An article of the class described comprising a hollow collapsible supporting member, and a tubular dry food casing shortened by circumferential folds, said supporting member passing through the casing.

8. The method of handling a tubular flexible food container which comprises drawing it, while in a moist state, into circumferential folds and over a hollow water-proof supporting member, drying it while so mounted, and afterward immersing the container and support in a liquid to render the container pliable, and applying the container to the stuffer nozzle of a stuffing machine.

9. The method of handling a tubular flexible food container which comprises drawing it into circumferential folds and over a hollow water-proof supporting member, and afterward immersing the container and support in a liquid to render the container pliable, and applying the container to the stuffer nozzle of a stuffing machine.

In testimony whereof, I have hereunto set my hand this the 22nd day of January, 1924.

FRANK v. BRECHT. [L. S.]